United States Patent
Hegde et al.

(10) Patent No.: US 10,298,673 B2
(45) Date of Patent: May 21, 2019

(54) ROAMING TO SHARE A COMMUNICATION CHANNEL

(71) Applicant: Microsoft Technology Licensing, LLC, Redmond, WA (US)

(72) Inventors: Uday Sooryakant Hegde, Redmond, WA (US); Victor Juan Broto Cartagena, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 205 days.

(21) Appl. No.: 15/223,758

(22) Filed: Jul. 29, 2016

(65) Prior Publication Data

US 2018/0035474 A1  Feb. 1, 2018

(51) Int. Cl.
| | |
|---|---|
| *H04L 29/08* | (2006.01) |
| *H04W 76/15* | (2018.01) |
| *H04W 76/10* | (2018.01) |
| *H04W 88/06* | (2009.01) |
| *H04W 76/14* | (2018.01) |

(52) U.S. Cl.
CPC ........... *H04L 67/104* (2013.01); *H04W 76/10* (2018.02); *H04W 76/15* (2018.02); *H04W 76/14* (2018.02); *H04W 88/06* (2013.01)

(58) Field of Classification Search
CPC ...... H04W 76/02; H04W 28/02; H04L 67/104
See application file for complete search history.

(56) References Cited

U.S. PATENT DOCUMENTS

| | | | |
|---|---|---|---|
| 6,243,581 | B1 | 6/2001 | Jawanda |
| 6,944,144 | B2 | 9/2005 | Guo et al. |
| 7,039,027 | B2 | 5/2006 | Bridgelall |
| 7,065,376 | B2 | 6/2006 | Wolman et al. |
| 7,280,506 | B2 | 10/2007 | Lin et al. |
| 7,324,478 | B2 | 1/2008 | Park et al. |

(Continued)

FOREIGN PATENT DOCUMENTS

| | | |
|---|---|---|
| DE | 102014214422 A1 | 1/2016 |
| EP | 2605607 A1 | 6/2013 |
| WO | 2014068456 A1 | 5/2014 |

OTHER PUBLICATIONS

"WDI Extended Channel Switch Announcement (ECSA)", Retrieved on: Dec. 28, 2015 vailable at: https://msdn.microsoft.com/en-us/library/windows/hardware/mt297639(v=vs.85).aspx.

(Continued)

*Primary Examiner* — Jamal Javaid
(74) *Attorney, Agent, or Firm* — Ray Quinney & Nebeker, P.C.; James S. Bullough (57) ABSTRACT

A computing device is able to communicate wirelessly with other devices using different types of wireless networks, such as infrastructure networks and peer-to-peer networks. Situations can arise in which a computing device is connected to different types of networks at the same time. In such situations a check is made as to whether the computing device can connect to a first of the wireless networks using the same channel as is used by the computing device to connect to a second of the wireless networks. If so, then the computing device connects to the first wireless network using the same channel as is used by the computing device to connect to the second wireless network, resulting in the computing device sharing the same channel for the multiple wireless networks.

19 Claims, 6 Drawing Sheets

(56) References Cited

U.S. PATENT DOCUMENTS

| | | |
|---|---|---|
| 7,324,818 B2 | 1/2008 | Gallagher et al. |
| 7,924,785 B2 | 4/2011 | Shaheen et al. |
| 8,005,058 B2 | 8/2011 | Pecen |
| 8,126,447 B2 | 2/2012 | Hillan |
| 8,340,071 B2 | 12/2012 | Sadri et al. |
| 8,638,769 B2 | 1/2014 | Purkayastha et al. |
| 2006/0009187 A1 | 1/2006 | Sheynman et al. |
| 2012/0166671 A1 | 6/2012 | Qi et al. |
| 2014/0204934 A1* | 7/2014 | Nicosia ................. H04W 8/245 370/338 |
| 2015/0195860 A1 | 7/2015 | Joshi |
| 2015/0215939 A1 | 7/2015 | Kikkawa et al. |
| 2016/0066361 A1* | 3/2016 | Ogawa ................ H04W 76/025 370/315 |

OTHER PUBLICATIONS

"International Search Report and Written Opinion Issued in PCT Application No. PCT/US2017/042960", dated Oct. 24, 2017, 11 Pages.

\* cited by examiner

ROAMING TO SHARE A COMMUNICATION CHANNEL

BACKGROUND

As computing technology has advanced, computing devices have become increasingly interconnected. Many computing devices can communicate with one another via various different wireless communication protocols, and in some situations a computing device can simultaneously communicate with multiple other computing devices using different communication protocols. This simultaneous communication, however, is not without its problems. One such problem is that switching between using these different communication protocols can take time and consume resources of the computing device, degrading the performance of communication with both of the other computing devices.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with one or more aspects, a determination is made that a computing device is connected to both a first wireless network and a second wireless network. A particular channel of the second wireless network that the computing device is using to connect to the second wireless network is identified. A determination is also made as to whether the computing device can connect to the first wireless network using that particular channel. This determination is made without communicating with another device on the first wireless network for the other device to change to using that particular channel. In response to determining that the computing device can connect to the first wireless network using that particular channel, the computing device connects to the first wireless network using that particular channel.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Roaming to share a communication channel is discussed herein. A computing device is able to communicate wirelessly with other devices using different types of wireless networks. These different types of wireless networks refer to wireless networks conforming to different protocols or wireless connection techniques. For example, one type of wireless network is an infrastructure network in which the computing device communicates with other devices via a wireless access point, router, and/or other types of network hardware. By way of another example, another type of wireless network is a peer-to-peer (P2P) network in which the computing device communicates directly with other devices without passing communications through any other network hardware (e.g., wireless access point, router, etc.).

When communicating wirelessly with other devices, the computing device communicates on a particular channel. A channel refers to a particular frequency or frequency range, such as 2412 Megahertz (MHz) or a range of 2401 MHz to 2423 MHz, 5200 MHz or a range 5190 MHz to 5210 MHz, and so forth. Wireless networks typically support multiple different channels, and different types of wireless networks can, and oftentimes do, use the same channels as are used by other wireless networks.

Situations can arise in which a computing device is communicating with multiple other devices using different types of wireless networks. For example, a computing device may be connected to two different wireless networks, a first wireless network (e.g., an infrastructure network) allowing the computing device to communicate with another device A on example channel X, and a second wireless network (e.g., a peer-to-peer network) allowing the computing device to communicate with another device B on example channel Y. Using the techniques discussed herein, in such situations a check is made as to whether the computing device can connect to the first wireless network using channel Y. If so, then the computing device connects to the first wireless network using channel Y.

By changing the connection to the first wireless network to be on the same channel as is used to connect to the second wireless network, the computing device can improve the use of its single transceiver to connect to both the first and second wireless networks on the same channel. This eliminates the need for the transceiver to change between communicating on different channels for the two different wireless networks, thereby reducing the time needed by the transceiver when changing between communicating on different channels and improving the performance of communication over one or both of the wireless networks.

Figure 1:
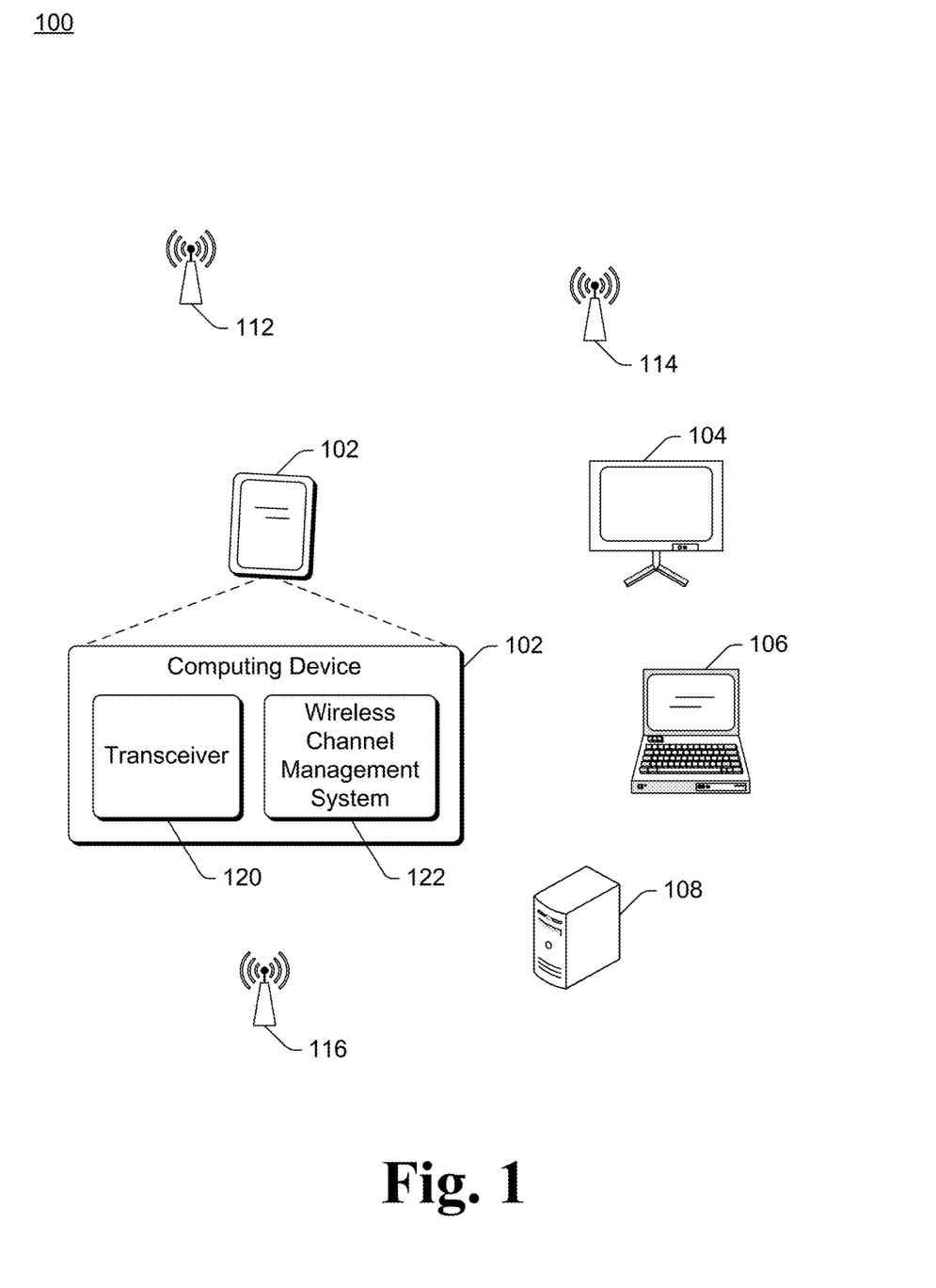
FIG. 1 illustrates an example environment implementing roaming to share a communication channel in accordance with one or more embodiments.

FIG. 1 illustrates an example environment 100 implementing roaming to share a communication channel in accordance with one or more embodiments. The environment 100 includes a computing device 102 that can communicate with one or more devices 104, 106, and 108.

Computing device 102 is illustrated as a mobile device, although computing device 102 can be any of a variety of different types of devices, such as a desktop computer, a server computer, a laptop or netbook computer, a mobile device (e.g., a tablet or phablet device, a cellular or other wireless phone (e.g., a smartphone), a notepad computer, a mobile station), a wearable device (e.g., eyeglasses, head-mounted display, watch, bracelet), an entertainment device (e.g., an entertainment appliance, a set-top box communicatively coupled to a display device, a game console), Internet of Things (IoT) devices (e.g., objects or things with software, firmware, and/or hardware to allow communication with other devices), a television or other display device, an automotive computer, and so forth. Thus, computing device 102 may range from a full resource device with substantial memory and processor resources (e.g., personal computers, game consoles) to a low-resource device with limited memory and/or processing resources (e.g., traditional set-top boxes, hand-held game consoles).

Devices 104, 106, and 108 are illustrated as a display device, laptop computer, and desktop computer, respectively. However, each of the devices 104, 106, and 108 can be any of a variety of different types of devices analogous to the discussion above regarding computing device 102.

The computing device 102 can communicate wirelessly with the devices 104, 106, and 108 using various different types of wireless networks. In one or more embodiments, the computing device 102 can communicate wirelessly with at least one of the devices 104, 106, and 108 using an infrastructure network, and can communicate wirelessly with at least one of the devices 104, 106, and 108 using a peer-to-peer network. An infrastructure network refers to a wireless network in which the computing device 102 communicates with other devices via a wireless access point, router, and/or other types of network hardware. Examples of such network hardware are shown as wireless access points 112, 114, and 116. An infrastructure network can be implemented using any of a variety of different wireless network protocols, such as a Wi-Fi network (e.g., a network that conforms to the IEEE 802.11b standard, the IEEE 802.11ac standard), a WiGig network (e.g., a network that conforms to the IEEE 802.11ad standard), and so forth.

A peer-to-peer (P2P) network refers to a wireless network in which the computing device 102 communicates directly with other devices without passing communications through any other network hardware (e.g., wireless access points 116). A peer-to-peer network can be implemented using any of a variety of different peer-to-peer wireless network protocols, such as Wi-Fi Direct.

The computing device 102 includes a transceiver 120 and a wireless channel management system 122. The transceiver 120 is implemented at least in part in hardware, and operates to transmit and receive wireless signals on multiple different channels. Although illustrated as a transceiver, alternatively the functionality of the transceiver 120 can be separated into two different modules or components—a transmitter component that transmits wireless signals on multiple different channels and a receiver component that receives wireless signals on multiple different channels.

The wireless channel management system 122 manages changing of the channel used for one wireless network (e.g., an infrastructure network) to be the same as another wireless network (e.g., a peer-to-peer network). The wireless channel management system 122 determines when to change the channel of the one wireless network, and coordinates changing of the channel as discussed in more detail below.

The computing device 102 can be connected to multiple different wireless networks simultaneously, allowing the computing device 102 to communicate with different devices over different wireless networks simultaneously. Connecting to multiple different wireless networks simultaneously refers to being able to maintain connections to the multiple different wireless networks concurrently. It should be noted, however, that despite reference to "simultaneously", the transceiver time multiplexes the transmitting and/or receiving of data for the different wireless networks, so at any given instant in time data is being transmitted or received by the transceiver 120 for only one of the wireless networks.

Generally, when the computing device 102 is connected to two different wireless networks simultaneously, the wireless channel management system 122 determines whether the computing device 102 is connected to those two different wireless networks on the same channel. If the computing device 102 is not connected to those two different wireless networks on the same channel, then the wireless channel management system 122 determines whether the channel for one of the wireless networks (e.g., the infrastructure network) can be changed to be the same as the channel used for the other of the wireless networks (e.g., the peer-to-peer network) and still have the computing device 102 remain connected to both of the two networks. If the channel can be changed, wireless channel management system 122 coordinates with the transceiver 120 to change the channel for the one of the wireless networks (e.g., the infrastructure network).

The computing device 102 being connected to a wireless network refers to the computing device 102 being able to communicate with at least one other device or network component (e.g., an access point) in the wireless network. This connection can include having knowledge of network and/or device names, passwords or access codes, and so forth. For example, being connected to an infrastructure network refers to being within wireless communication range of (being able to receive signals from and send signals to) at least one access point and having logged into or joined the infrastructure network as a result of having knowledge of the name and optionally a password for the infrastructure network. By way of another example, being connected to a peer-to-peer network refers to being within wireless communication range of another device and having wirelessly connected to the other device as a result of having knowledge of a name and/or access code to be able to communicate with that other device using a peer-to-peer network protocol.

As discussed above, the wireless channel management system 122 determines whether the channel for one of the wireless networks (e.g., the infrastructure network) can be changed to be the same as the channel used for the other of the wireless networks (e.g., the peer-to-peer network) and still have the computing device 102 remain connected to both of the two networks. In one or more embodiments, this determination is made by the wireless channel management system 122 receiving from the transceiver 120 an indication of different channels for the one of the wireless networks for which the transceiver 120 receives data. The wireless channel management system 122 compares these indicated channels to that used by the other of the wireless networks to determine whether any of those indicated channels is the same as is used by the other of the wireless networks.

For example, an infrastructure network typically has a name or identifier, which can be the Service Set Identifier (SSID) of the wireless network. The infrastructure network can include different access points all using the same SSID, but having different Basic Service Set Identifiers (BSSIDs) allowing the individual access points to be identified or distinguished from one another. The different access points can transmit and receive signals on different channels. Situations can arise in which the computing device 102 is within range of multiple different access points each with different BSSIDS but that share the same SSID (and thus are part of the same wireless network), but are transmitting and receiving signals on different channels. If one of those access points is transmitting and receiving signals on the same channel as the other of the wireless networks (e.g., the peer-to-peer network), then the wireless channel management system 122 instructs the transceiver 120 to roam to (change to) communicating with the particular access point that transmits and receives signals on the same channel as the other of the wireless networks. This roaming includes the transceiver 120 changing to the channel used by the particular access point, and optionally includes communication with the particular access point (and/or the access point with which the transceiver 120 previously was communicating) to notify the access point(s) that the computing device 102 will be communicating with the particular access point.

Figure 2:
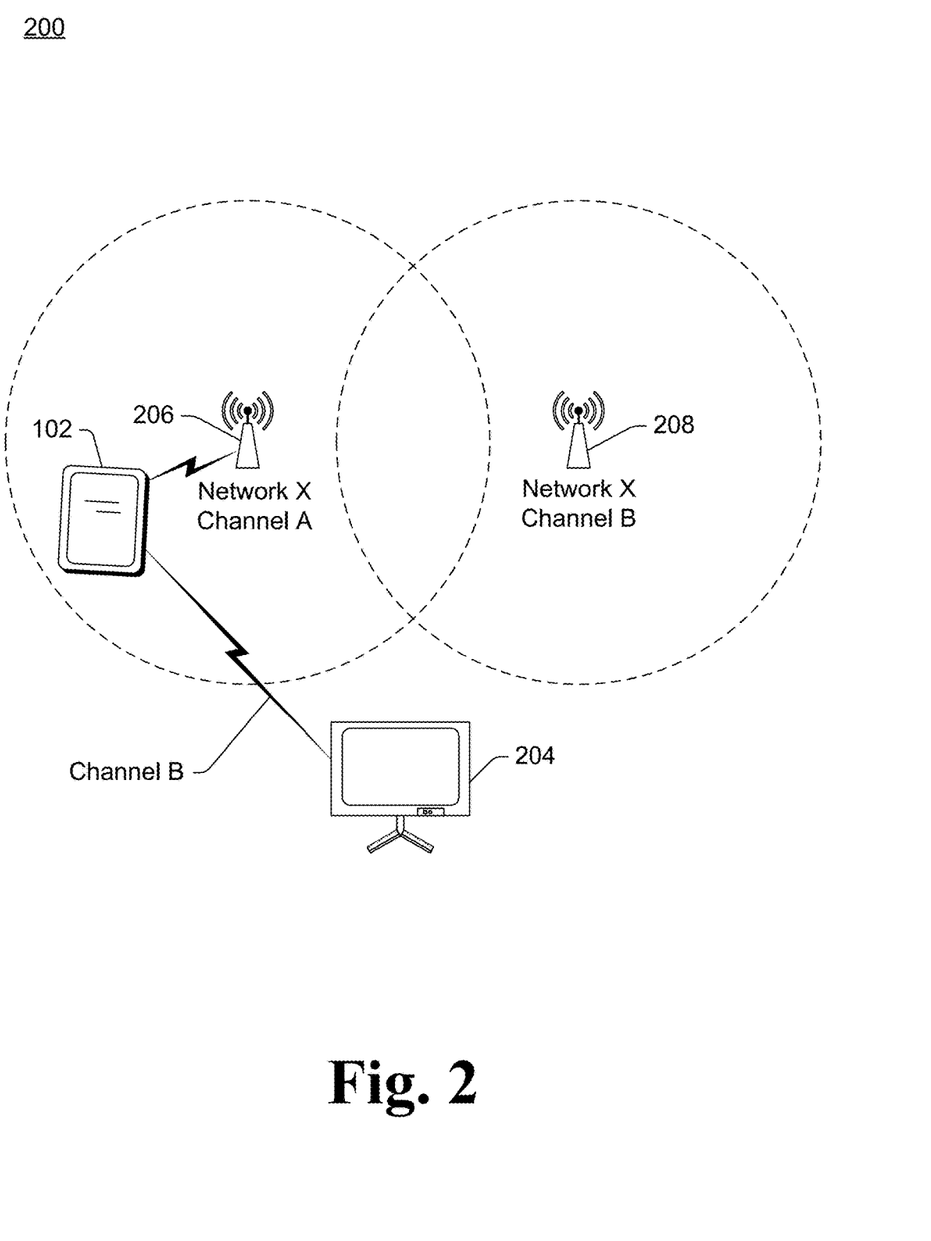
FIGS. 2 and 3 illustrate examples of roaming to share a communication channel in accordance with one or more embodiments.
Figure 3:
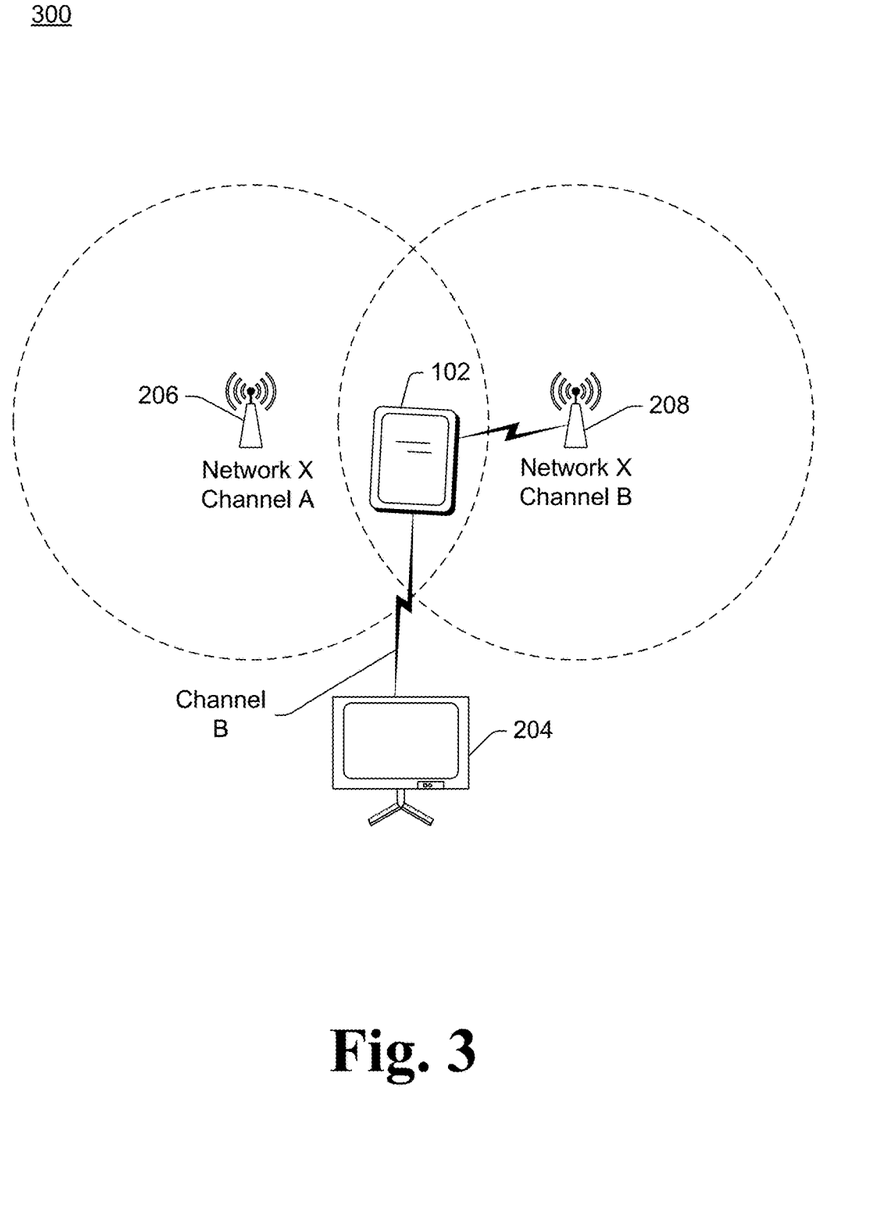

FIGS. 2 and 3 illustrate examples of roaming to share a communication channel in accordance with one or more embodiments. FIG. 2 illustrates an environment 200 in which a computing device 102 is connected to two different wireless networks: an infrastructure network having the identifier (e.g., SSID) of "X", and a peer-to-peer network with a display device 204. The infrastructure network is illustrated with two access points 206 and 208. Although the infrastructure network can have any number of access points, two are illustrated in FIG. 2 for ease of explanation. Each access point 206 and 208 transmits and receives signals on a different channel (e.g., access point 206 transmits and receives signals on Channel A, and access point 208 transmits and receives signals on Channel B). The computing device 102 also communicates with display device 204 on a peer-to-peer network using Channel B. Channel B is the same frequency or frequency range as is used by the access point 208 to transmit and receive signals.

For each of the access points 206 and 208, a dashed circle around the access point shows the communication range of the access point. The communication range of an access point refers to the range of or area in which the a device can receive signals from the access point and transmit signals to (and that are received by) the access point. The computing device 102 is within communication range of, and thus can communicate with, a particular access point if the computing device 102 is inside of the dashed circle. Thus, as illustrated in FIG. 2, the computing device 102 is within communication range of access point 206, and thus communicates with the infrastructure network on Channel A.

FIG. 3 illustrates the environment 200, which is the same as in FIG. 2 except that the location of the computing device 102 has changed. In FIG. 3, the computing device 102 is within communication range of access point 206 and access point 208. However, access point 208 transmits and receives signals on the same channel (Channel B) as is used by the computing device 102 for the peer-to-peer network. Thus, the computing device 102 changes to use Channel B so that the computing device 102 communicates with the infrastructure network and the peer-to-peer network on the same channel. Thus, for the computing device 102, Channel B is shared by both the infrastructure network and the peer-to-peer network.

Figure 4:
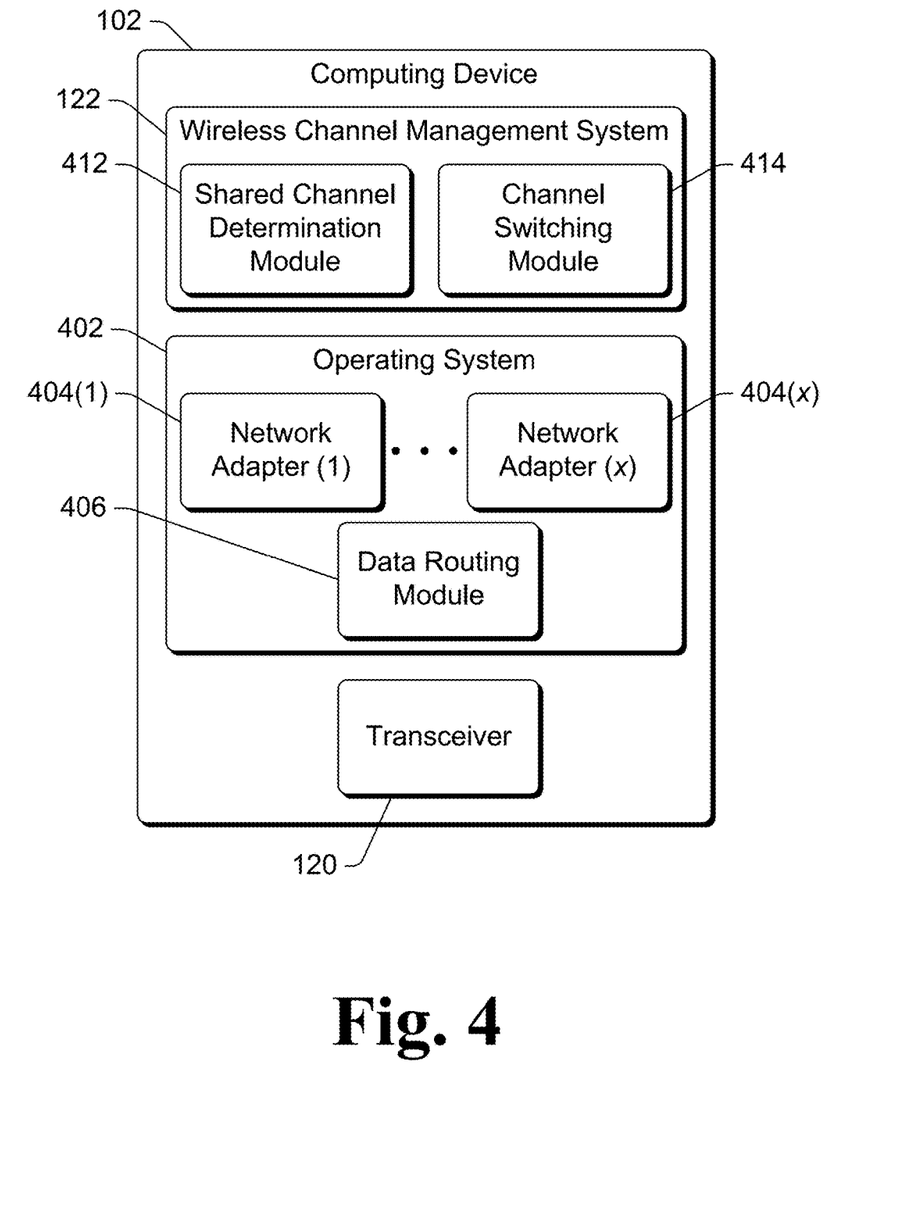
FIG. 4 illustrates an example computing device implementing roaming to share a communication channel in accordance with one or more embodiments.

FIG. 4 illustrates an example computing device 102 implementing roaming to share a communication channel in accordance with one or more embodiments. The computing device 102 includes a transceiver 120 and a wireless channel management system 122 as discussed above, and also includes an operating system 402. The wireless channel management system 122 is illustrated as separate from the operating system 402, but alternatively can be included as part of the operating system 402.

The operating system 402 includes multiple (x) network adapters 404(1), . . . , 404(x) and a data routing module 406.

In one or more embodiments, each of the network adapters 404(1), . . . , 404(x) is a virtual network adapter. The transceiver 120 receives data on wireless signals and provides the received data to the data routing module 406. In one or more embodiments, the transceiver 120 decodes received signals to generate packets of data that are provided to the data routing module 406. Each packet of data typically includes at least a header portion that describes the packet and a content portion that includes data being communicated by a device. Each network adapter 404 is associated with a different wireless network. Data routing module 406 analyzes packets of data received from the transceiver 120 to determine which type of wireless network (e.g., infrastructure or peer-to-peer) the packet is associated with. In one or more embodiments, the header portion of the data packet includes an identifier of the type of wireless network the packet is associated with or other information from which the data routing module 406 can ascertain the type of wireless network that the data packet is associated with. The data routing module 406 then provides the data packet to the network adapter 404 that is associated with the same type of wireless network as the data packet. Various other programs or modules running on the computing device 102, such as applications or other programs of the operating system 402, can then obtain the data packet from the network adapter 404.

Similarly, a program or module running on the computing device 102 that desires to send data to another device via a wireless network communicates the data to one of the network adapters 404. The program or module is associated with a particular one of the types of wireless networks, and communicates data to the network adapter 404 associated with that same type of wireless network. In one or more embodiments, the operating system 402 restricts applications running on the computing device 102 to communicating with only one of the network adapters.

A network adapter 404 receives data to be communicated to another device and generates one or more data packets that include that data. The format of the data packets varies based on the particular type of wireless network. The network adapter 404 then provides the data packet to the transceiver 120, which transmits the wireless network on the channel that the transceiver 120 is configured to use for that type of wireless network.

It should be noted that the transceiver 120 time multiplexes data transmission. Thus, if data packets are ready to be sent on each of two different types of networks, the transceiver 120 transmits one packet followed by the other. However, using the techniques discussed herein, when the two different types of networks are connected to on the same channel, the transceiver 120 need not expend any additional time or resources to switch to different channels when transmitting or receiving data for the two different types of networks.

The wireless channel management system 122 includes a shared channel determination module 412 and a channel switching module 414. The shared channel determination module 412 determines when the channel of one wireless network can be changed to be the same as that of another type of network. This determination can be made in various manners, such as by determining whether the computing device 102 is within communication range of an access point for an infrastructure network that is transmitting and receiving signals on the same channel as a peer-to-peer network as discussed above.

The shared channel determination module 412, upon determining to change the channel of a wireless network, notifies the channel switching module 414 to change the channel of the wireless network. The channel switching module 414 coordinates with the transceiver 120 to roam to (change to) the new channel for the wireless network. The channel switching module 414 notifies the transceiver 120 of the new channel, and optionally communicates (via the appropriate network adapter 404) data or instructions to one or more access points to notify the access point(s) that the computing device 102 will be communicating with a different access point on the new channel.

Figure 5:
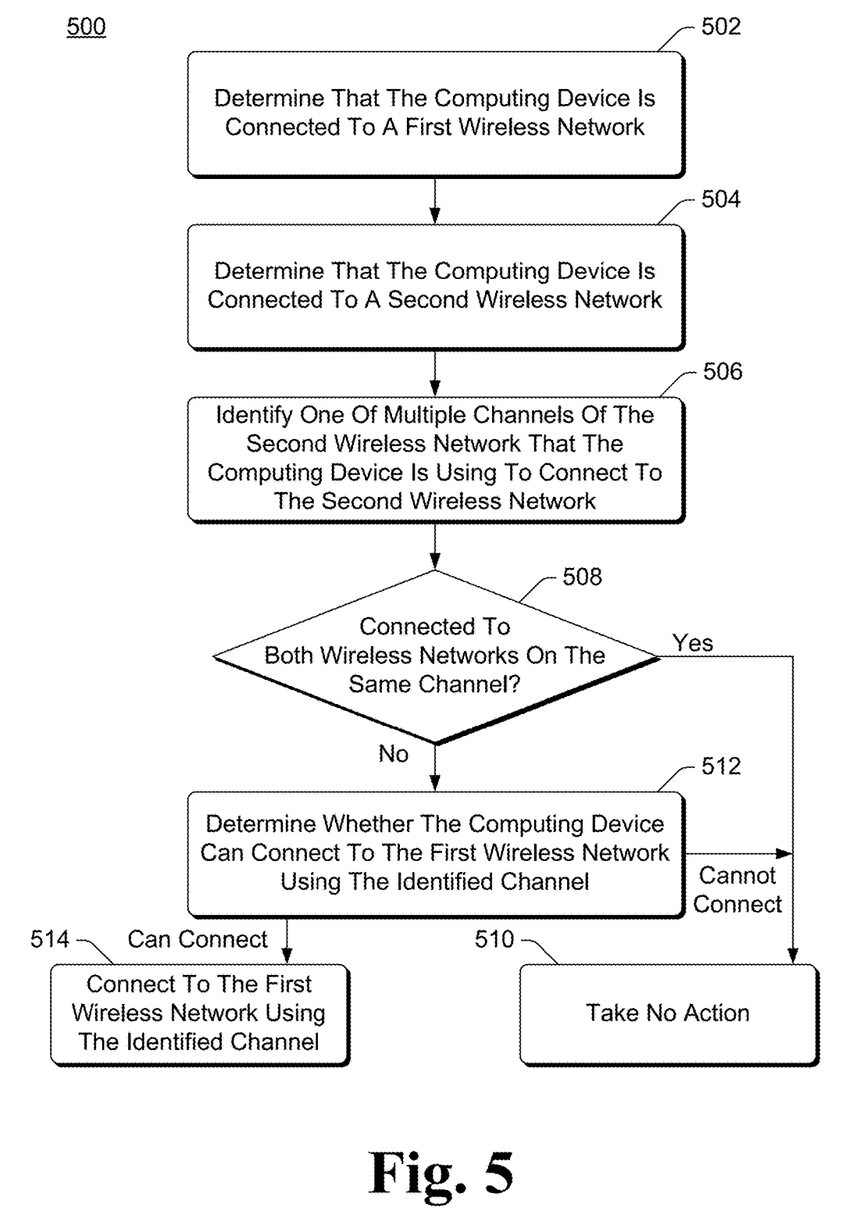
FIG. 5 is a flowchart illustrating an example process for roaming to share a communication channel in accordance with one or more embodiments.

FIG. 5 is a flowchart illustrating an example process 500 for roaming to share a communication channel in accordance with one or more embodiments. Process 500 is carried out by a device, such as computing device 102 of FIG. 1, 2, 3, or 4, and can be implemented in software, firmware, hardware, or combinations thereof. The process 500 can be carried out at least in part by a wireless channel management system, such as the wireless channel management system 122 of FIG. 1 or FIG. 4. Process 500 is shown as a set of acts and is not limited to the order shown for performing the operations of the various acts. Process 500 is an example process for roaming to share a communication channel; additional discussions of roaming to share a communication channel are included herein with reference to different figures.

In process 500, a determination is made that the computing device is connected to a first wireless network (act 502) and to a second wireless network (act 504). The first wireless network is, for example, an infrastructure network and the second wireless network is, for example, a peer-to-peer network.

One of multiple channels of the second wireless network that the computing device is using to connect to the second wireless network is identified (act 506). This identification can be made in various different manners, such as based on an indication received from a transceiver in the computing device, information maintained or tracked by an operating system of the computing device, and so forth. One of the multiple channels being used to connect to the second wireless network can be selected in various different manners based on the protocol implemented by the second wireless network.

A check is then made as to whether the computing device is connected to both the first wireless network and the second wireless network on the same channel (act 508). If the computing device is connected to both the first wireless network and the second wireless network on the same channel, then no action is taken (act 510). No channel change need be made because both the computing device is already connected to both the first wireless network and the second wireless network on the same channel.

However, if the computing device is not connected to both the first wireless network and the second wireless network on the same channel, then a determination is made as to whether the computing device can connect to the first wireless network using the same channel as is used to connect to the second wireless network (act 512). This channel is the channel identified in act 506. In one or more embodiments, the computing device can connect to the first wireless network using the same channel as is used to connect to the second wireless network if there is an access point within communication range of the computing device transmitting and receiving signals on the channel used by the second wireless network. Various additional criteria can optionally be applied in determining whether the computing device can connect to the same channel as is used to connect to the second wireless network, such as if the signal strength from the access point satisfies (e.g., is at least) a threshold signal strength, if data transfer rate to and/or from the access point satisfies (e.g., is at least) a threshold data transfer rate, and so forth.

It should be noted that the determination is made in act 512 autonomously by the computing device implementing process 500. No indication, request, negotiation, and so forth regarding a channel change need be sent to or made with another device on the second wireless network.

If the computing device cannot connect to the first wireless network using the same channel as is used to connect to the second wireless network, then no action is taken (act 510). No channel change need be made because the computing device cannot connect to the first wireless network on the same channel as is used to connect to the second wireless network.

However, if the computing device can connect to the first wireless network using the same channel as is used to connect to the second wireless network, then the computing device connects to the first wireless network using the same channel as is used to connect to the second wireless network (act 514). This channel is the channel identified in act 506. The computing device changes or roams to the channel identified in act 506 for the first wireless network, so the computing device is connected to both the first wireless network and the second wireless network on the same channel.

If a determination is made that the computing device cannot connect to the first wireless network using the channel identified in act 506, process 500 can be repeated at regular or irregular intervals. For example, process 500 can be repeated every 60 seconds to determine whether the computing device can connect to the first wireless network using the identified channel. By way of another example, process 500 can be repeated in response to various other events, such as movement of the computing device by at least a threshold amount (e.g., as determined by a drop in signal strength in the channel used to connect to the second wireless network, such as a drop in RSSI (Receive Signal Strength Indicator) below a threshold (e.g., −60 dBm (decibel-milliwatts))), a change in the channel used to connect to the second wireless network, and so forth.

Additionally or alternatively, in situations in which the computing device cannot connect to the first wireless network using the identified channel in act 512, other actions can be taken rather than no action in act 510. In one or more embodiments, various additional parameters can be used to determine whether the capacity of data transmission on the first wireless network and/or the second wireless network can be improved by switching to a different channel. One such parameter is whether there is another channel that the computing device can use to connect to the first wireless network that has a higher capacity or bandwidth than the current channel used by the computing device to connect to the first wireless network. For example, assume that the computing device is connected to the first wireless network on channel A, and to the second wireless network on channel B. If the determination is made that the computing device cannot connect to the first wireless network on channel B, but could connect to the first wireless network on channel C (which has a higher capacity or bandwidth than channel A), then rather than taking no action in act 510 the computing device can connect to the first wireless network using channel C rather than channel A.

Various different parameters of a channel can be used to identify the capacity or bandwidth of a channel. For example, RSSI can be used to estimate the capacity or bandwidth of channels, with stronger (e.g., higher) RSSI values indicating higher capacity or bandwidth than weaker (e.g., lower) RSSI values. Various other parameters of a channel can be used to identify the capacity or bandwidth of the channel, such as rates and spatial streams advertised by a wireless access point, noise floor values, number of stations connected to the same access point, usage of the channel (e.g., number of bytes transferred on average over some duration of time by the other stations connected to the same access point), and so forth.

Another parameter that can be used to determine whether the capacity of data transmission on the first wireless network and/or the second wireless network can be improved is whether there is another channel that the computing device can use to connect to the first wireless network that has a smaller switch time than the current channel used by the computing device to connect to the first wireless network. The switch time refers to the amount of time taken for the transceiver (e.g., the transceiver 120 of FIG. 1 or FIG. 4) to switch between using two different channels for transmitting or receiving data. For example, assume that the computing device is connected to the first wireless network on channel A, and to the second wireless network on channel B. If the determination is made that the computing device cannot connect to the first wireless network on channel B, but could connect to the first wireless network on channel C (and the switch time between channel B and channel C is less than the switch time between channel B and channel A), then rather than taking no action in act 510 the computing device can connect to the first wireless network using channel C rather than channel A.

The switch time between different pairs of channels can vary. For example, switch time between two channels that are on the same Wi-Fi sub band may be smaller than the switch time between two channels that are not on the same Wi-Fi sub band. By way of another example, switch time between two channels having harmonic carriers may be smaller than the switch time between two channels that do not have harmonic carriers.

Using the techniques discussed herein, a computing device determines when it can change the channel used to connect to one wireless network (e.g., an infrastructure network) to be the same as the channel used to connect to another wireless network (e.g., a peer-to-peer network). This determination is made autonomously—no negotiation of which channel to use is made with other devices, and other devices need not have any knowledge that the computing device is changing the channel. Additionally, the determination is made by the computing device without receiving a request, message, or other instruction from another device to make the channel change. The techniques discussed herein also increase the performance (e.g., the capacity) of the channels by eliminating the time taken to switch between channels and thus increasing the amount of time that can be spent transmitting or receiving data on each channel. This increased performance can result in improved video quality, improved audio quality, and so forth.

Although particular functionality is discussed herein with reference to particular modules, it should be noted that the functionality of individual modules discussed herein can be separated into multiple modules, and/or at least some functionality of multiple modules can be combined into a single module. Additionally, a particular module discussed herein as performing an action includes that particular module itself performing the action, or alternatively that particular module invoking or otherwise accessing another component or module that performs the action (or performs the action in conjunction with that particular module). Thus, a particular module performing an action includes that particular module itself performing the action and/or another module invoked or otherwise accessed by that particular module performing the action.

Figure 6:
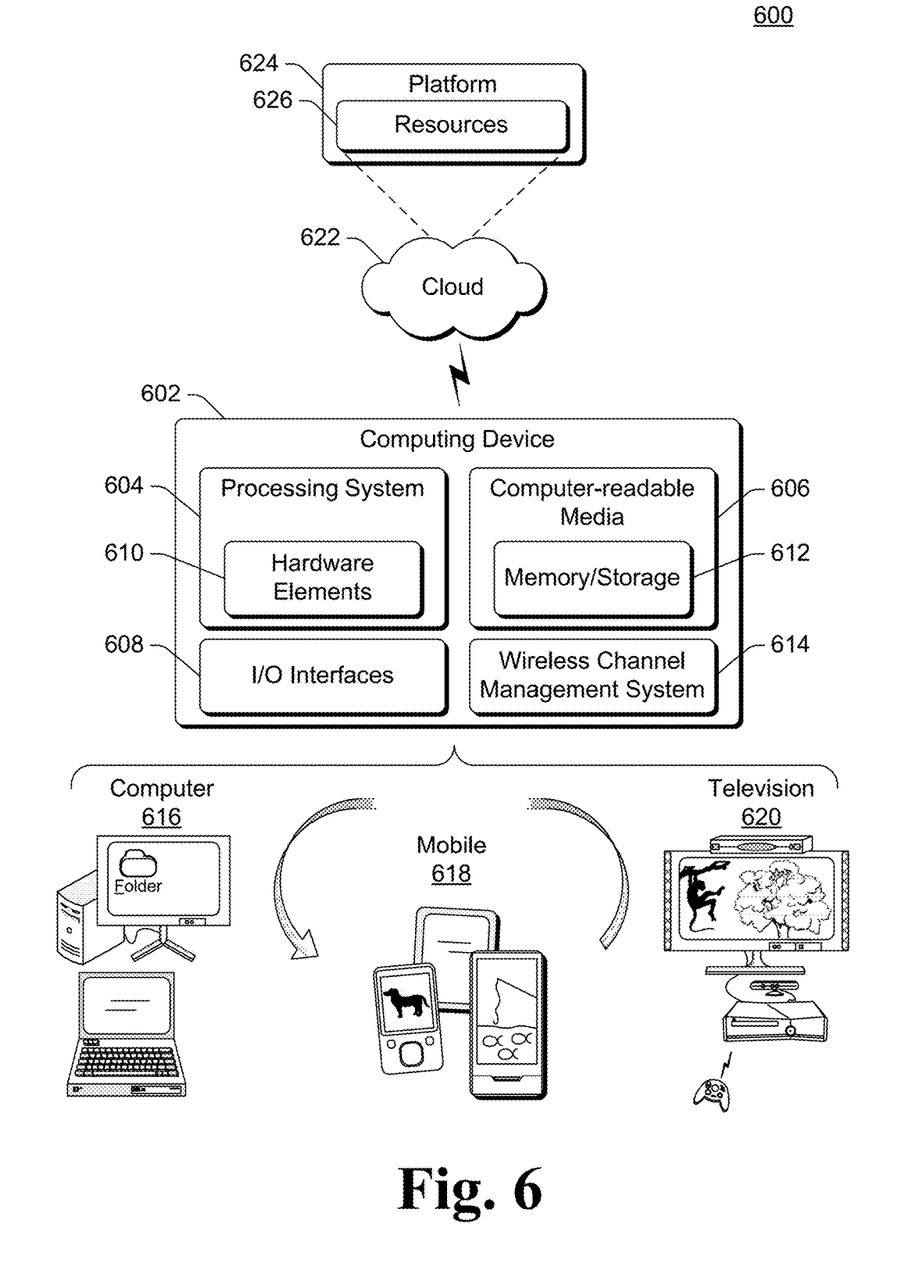
FIG. 6 illustrates an example system that includes an example computing device that is representative of one or more systems and/or devices that may implement the various techniques described herein.

FIG. 6 illustrates an example system generally at 600 that includes an example computing device 602 that is representative of one or more systems and/or devices that may implement the various techniques described herein. The computing device 602 may be, for example, a server of a service provider, a device associated with a client (e.g., a client device), an on-chip system, and/or any other suitable computing device or computing system.

The example computing device 602 as illustrated includes a processing system 604, one or more computer-readable media 606, and one or more I/O Interfaces 608 that are communicatively coupled, one to another. Although not shown, the computing device 602 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 604 is representative of functionality to perform one or more operations using hardware. Accordingly, the processing system 604 is illustrated as including hardware elements 610 that may be configured as processors, functional blocks, and so forth. This may include implementation in hardware as an application specific integrated circuit or other logic device formed using one or more semiconductors. The hardware elements 610 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 606 is illustrated as including memory/storage 612. The memory/storage 612 represents memory/storage capacity associated with one or more computer-readable media. The memory/storage 612 may include volatile media (such as random access memory (RAM)) and/or nonvolatile media (such as read only memory (ROM), Resistive RAM (ReRAM), Flash memory, optical disks, magnetic disks, and so forth). The memory/storage 612 may include fixed media (e.g., RAM, ROM, a fixed hard drive, and so on) as well as removable media (e.g., Flash memory, a removable hard drive, an optical disc, and so forth). The computer-readable media 606 may be configured in a variety of other ways as further described below.

The one or more input/output interface(s) 608 are representative of functionality to allow a user to enter commands and information to computing device 602, and also allow information to be presented to the user and/or other components or devices using various input/output devices. Examples of input devices include a keyboard, a cursor control device (e.g., a mouse), a microphone (e.g., for voice inputs), a scanner, touch functionality (e.g., capacitive or other sensors that are configured to detect physical touch), a camera (e.g., which may employ visible or non-visible wavelengths such as infrared frequencies to detect movement that does not involve touch as gestures), and so forth. Examples of output devices include a display device (e.g., a monitor or projector), speakers, a printer, a network card, tactile-response device, and so forth. Thus, the computing device 602 may be configured in a variety of ways as further described below to support user interaction.

The computing device 602 also includes a wireless channel management system 614. The wireless channel management system 614 provides various functionality for changing the channel used to connect to a wireless network as discussed above. The wireless channel management system 614 can implement, for example, the wireless channel management system 122 of FIG. 1 or FIG. 4.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of computing platforms having a variety of processors.

An implementation of the described modules and techniques may be stored on or transmitted across some form of computer-readable media. The computer-readable media may include a variety of media that may be accessed by the computing device 602. By way of example, and not limitation, computer-readable media may include "computer-readable storage media" and "computer-readable signal media."

"Computer-readable storage media" refers to media and/or devices that enable persistent storage of information and/or storage that is tangible, in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" refers to a signal-bearing medium that is configured to transmit instructions to the hardware of the computing device 602, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, the hardware elements 610 and computer-readable media 606 are representative of instructions, modules, programmable device logic and/or fixed device logic implemented in a hardware form that may be employed in some embodiments to implement at least some aspects of the techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable storage media described previously.

Combinations of the foregoing may also be employed to implement various techniques and modules described herein. Accordingly, software, hardware, or program modules and other program modules may be implemented as one or more instructions and/or logic embodied on some form of computer-readable storage media and/or by one or more hardware elements 610. The computing device 602 may be configured to implement particular instructions and/or functions corresponding to the software and/or hardware modules. Accordingly, implementation of modules as a module that is executable by the computing device 602 as software may be achieved at least partially in hardware, e.g., through use of computer-readable storage media and/or hardware elements 610 of the processing system. The instructions and/or functions may be executable/operable by one or more articles of manufacture (for example, one or more computing devices 602 and/or processing systems 604) to implement techniques, modules, and examples described herein.

As further illustrated in FIG. 6, the example system 600 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 600, multiple devices are interconnected through a central computing device. The central computing device may be local to the multiple devices or may be located remotely from the multiple devices. In one or more embodiments, the central computing device may be a cloud of one or more server computers that are connected to the multiple devices through a network, the Internet, or other data communication link.

In one or more embodiments, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one or more embodiments, a class of target devices is created and experiences are tailored to the generic class of devices. A class of devices may be defined by physical features, types of usage, or other common characteristics of the devices.

In various implementations, the computing device 602 may assume a variety of different configurations, such as for computer 616, mobile 618, and television 620 uses. Each of these configurations includes devices that may have generally different constructs and capabilities, and thus the computing device 602 may be configured according to one or more of the different device classes. For instance, the computing device 602 may be implemented as the computer 616 class of a device that includes a personal computer, desktop computer, a multi-screen computer, laptop computer, netbook, and so on.

The computing device 602 may also be implemented as the mobile 618 class of device that includes mobile devices, such as a mobile phone, portable music player, portable gaming device, a tablet computer, a multi-screen computer, and so on. The computing device 602 may also be implemented as the television 620 class of device that includes devices having or connected to generally larger screens in casual viewing environments. These devices include televisions, set-top boxes, gaming consoles, and so on.

The techniques described herein may be supported by these various configurations of the computing device 602 and are not limited to the specific examples of the techniques described herein. This functionality may also be implemented all or in part through use of a distributed system, such as over a "cloud" 622 via a platform 624 as described below.

The cloud 622 includes and/or is representative of a platform 624 for resources 626. The platform 624 abstracts underlying functionality of hardware (e.g., servers) and software resources of the cloud 622. The resources 626 may include applications and/or data that can be utilized while computer processing is executed on servers that are remote from the computing device 602. Resources 626 can also include services provided over the Internet and/or through a subscriber network, such as a cellular or Wi-Fi network.

The platform 624 may abstract resources and functions to connect the computing device 602 with other computing devices. The platform 624 may also serve to abstract scaling of resources to provide a corresponding level of scale to encountered demand for the resources 626 that are implemented via the platform 624. Accordingly, in an interconnected device embodiment, implementation of functionality described herein may be distributed throughout the system 600. For example, the functionality may be implemented in part on the computing device 602 as well as via the platform 624 that abstracts the functionality of the cloud 622.

In the discussions herein, various different embodiments are described. It is to be appreciated and understood that each embodiment described herein can be used on its own or in connection with one or more other embodiments described herein. Further aspects of the techniques discussed herein relate to one or more of the following embodiments.

A method implemented in a computing device, the method comprising: determining that the computing device is connected to a first wireless network; determining that the computing device is connected to a second wireless network; identifying one of multiple channels of the second wireless network that the computing device is using to connect to the second wireless network; determining whether the computing device can connect to the first wireless network using the one channel without communicating with another device on the first wireless network for the other device to change to using the one channel; and connecting, in response to determining that the computing device can connect to the first wireless network using the one channel, the computing device to the first wireless network using the one channel.

Alternatively or in addition to any of the above described methods, any one or combination of: the first wireless network comprising an infrastructure network; the infrastructure network including multiple access points, at least two of the multiple access points transmitting and receiving signals using different channels; the second wireless network comprising a peer-to-peer network; the method further comprising repeating at regular or irregular intervals, in response to determining that the computing device cannot connect to the first wireless network using the one channel, determining whether the computing device can connect to the first wireless network using the one channel; the determining whether the computing device can connect to the first wireless network using the one channel comprising determining whether an access point of the first wireless network is within communication range of the computing device and is transmitting and receiving signals on the one channel; the determining whether the computing device can connect to the first wireless network using the one channel further comprising determining whether signals received from the access point are at least a threshold signal strength; the determining whether the computing device can connect to the first wireless network using the one channel comprising determining whether the computing device can connect to the first wireless network without receiving a notification or request from another device on the first wireless network to switch to the one channel; the method further comprising connecting, in response to determining that the computing device cannot connect to the first wireless network using the one channel, the computing device to the first wireless network using another channel resulting in improved capacity of data transmission on the first wireless network and/or the second wireless network.

A computing device comprising: a processor; and a computer-readable storage medium having stored thereon multiple instructions that, responsive to execution by the processor, cause the processor to: identify one of multiple channels of a peer-to-peer network that the computing device is using to connect to the peer-to-peer network; determine whether the computing device can connect to an infrastructure network using the one channel; and connect, in response to determining that the computing device can connect to the infrastructure network using the one channel, the computing device to the infrastructure network using the one channel.

Alternatively or in addition to any of the above described computing devices, any one or combination of: the infrastructure network including multiple access points, at least two of the multiple access points transmitting and receiving signals using different channels; wherein the multiple instructions further cause the processor to repeat at regular or irregular intervals, in response to determining that the computing device cannot connect to the infrastructure network using the one channel, determining whether the computing device can connect to the infrastructure network using the one channel; wherein to determine whether the computing device can connect to the infrastructure network using the one channel is to determine whether an access point of the infrastructure network is within communication range of the computing device and is transmitting and receiving signals on the one channel; wherein to determine whether the computing device can connect to the infrastructure network using the one channel is to determine whether the computing device can connect to the infrastructure network without receiving a notification or request from another device on the infrastructure network to switch to the one channel.

A computing device comprising: a transceiver configurable to transmit and receive signals on any of multiple different channels; and a wireless channel management system including a shared channel determination module and a channel switching module, the shared channel determination module configured to determine that the computing device is connected to both a first wireless network and a second wireless network, to identify one of the multiple different channels the computing device is using to connect to the second wireless network, and to determine whether the computing device can connect to the first wireless network using the one channel without communicating with another device on the first wireless network for the other device to change to using the one channel, the channel switching module configured to, in response to the shared channel determination module determining that the computing device can connect to the first wireless network using the one channel, coordinate with the transceiver for the computing device to connect the first wireless network using the one channel.

Alternatively or in addition to any of the above described computing devices, any one or combination of: the first wireless network comprising an infrastructure network; the second wireless network comprising a peer-to-peer network; the shared channel determination module further configured to repeat at regular or irregular intervals, in response to determining that the computing device cannot connect to the first wireless network using the one channel, determining whether the computing device can connect to the first wireless network using the one channel; wherein to determine whether the computing device can connect to the first wireless network using the one channel is to determine whether an access point of the first wireless network is within communication range of the computing device and is transmitting and receiving signals on the one channel; wherein to determine whether the computing device can connect to the first wireless network using the one channel is to determine whether the computing device can connect to the first wireless network without receiving a notification or request from another device on the first wireless network to switch to the one channel.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method implemented in a computing device, the method comprising:
   determining that the computing device is connected to a first wireless network;
   determining that the computing device is connected to a second wireless network;
   identifying one of multiple channels of the second wireless network that the computing device is using to connect to the second wireless network;
   determining, while the computing device is connected to both the first wireless network and the second wireless network and in response to the computing device being connected to the second wireless network using a different channel than is used to connect the computing device to the first wireless network, that the computing device can connect to the first wireless network using the one channel without communicating with another device on the first wireless network for the another device to change to using the one channel; and
   connecting, in response to determining that the computing device can connect to the first wireless network using the one channel, the computing device to the first wireless network using the one channel.

2. The method as recited in claim 1, the first wireless network comprising an infrastructure network.

3. The method as recited in claim 2, the infrastructure network including multiple access points, at least two of the multiple access points transmitting and receiving signals using different channels.

4. The method as recited in claim 1, the second wireless network comprising a peer-to-peer network.

5. The method as recited in claim 1, the determining whether the computing device can connect to the first wireless network using the one channel comprising determining whether an access point of the first wireless network is within communication range of the computing device and is transmitting and receiving signals on the one channel.

6. The method as recited in claim 5, the determining whether the computing device can connect to the first wireless network using the one channel further comprising determining whether signals received from the access point are at least a threshold signal strength.

7. The method as recited in claim 1, the determining whether the computing device can connect to the first wireless network using the one channel comprising determining whether the computing device can connect to the first wireless network without receiving a notification or request from another device on the first wireless network to switch to the one channel.

8. A computing device comprising:
   a processor; and
   a computer-readable storage medium having stored thereon multiple instructions that, responsive to execution by the processor, cause the processor to:
      identify one of multiple channels of a peer-to-peer network that the computing device is using to connect to the peer-to-peer network;
      determine, while the computing device is connected to both the peer-to-peer network and an infrastructure network and in response to the computing device being connected to the peer-to-peer network using a different channel than is used to connect the computing device to the infrastructure network, that the computing device can connect to the infrastructure network using the one channel without communicating with another device on the infrastructure network for the another device to change to using the one channel; and
      connect, in response to determining that the computing device can connect to the infrastructure network using the one channel, the computing device to the infrastructure network using the one channel.

9. The computing device as recited in claim 8, the infrastructure network including multiple access points, at least two of the multiple access points transmitting and receiving signals using different channels.

10. The computing device as recited in claim 8, wherein to determine whether the computing device can connect to the infrastructure network using the one channel is to determine whether an access point of the infrastructure network is within communication range of the computing device and is transmitting and receiving signals on the one channel.

11. The computing device as recited in claim 8, wherein to determine whether the computing device can connect to the infrastructure network using the one channel is to determine whether the computing device can connect to the infrastructure network without receiving a notification or request from another device on the infrastructure network to switch to the one channel.

12. A computer-readable storage medium having instructions thereon that, when executed by at least one processor, cause a computing device to:
- determine that the computing device is connected to both a first wireless network and a second wireless network;
- identify one of multiple channels of the second wireless network that the computing device is using to connect to the second wireless network;
- determine, while the computing device is connected to both the first wireless network and the second wireless network and in response to the computing device being connected to the second wireless network using a different channel than is used to connect the computing device to the first wireless network, whether the computing device can connect to the first wireless network using the one channel without communicating with another device on the first wireless network for the another device to change to using the one channel;
- if it is determined that the computing device can connect to the first wireless network using the one channel, connect to the first wireless network using the one channel; and
- if it is determined that the computing device cannot connect to the first wireless network using the one channel, waiting a duration of time to repeat determining whether the computing device can connect to the first wireless network using the one channel.

13. The computer-readable storage medium as recited in claim 12, the first wireless network comprising an infrastructure network.

14. The computer-readable storage medium as recited in claim 12, the second wireless network comprising a peer-to-peer network.

15. The computer-readable storage medium as recited in claim 12, further comprising instructions that, when executed by the at least one processor, cause the computing device to repeat at regular or irregular intervals, in response to determining that the computing device cannot connect to the first wireless network using the one channel, determining whether the computing device can connect to the first wireless network using the one channel.

16. The computer-readable storage medium as recited in claim 12, wherein to determine whether the computing device can connect to the first wireless network using the one channel is to determine whether an access point of the first wireless network is within communication range of the computing device and is transmitting and receiving signals on the one channel.

17. The computer-readable storage medium as recited in claim 12, wherein to determine whether the computing device can connect to the first wireless network using the one channel is to determine whether the computing device can connect to the first wireless network without receiving a notification or request from another device on the first wireless network to switch to the one channel.

18. The computer-readable storage medium of claim 12, further comprising instructions that, when executed by the at least one processor, cause the computing device to repeat at regular or irregular intervals, in response to determining that the computing device cannot connect to the first wireless network using the one channel, determining whether the computing device can connect to the first wireless network using the one channel.

19. The computer-readable storage medium of claim 12, further comprising instructions that, when executed by the at least one processor, cause the computing device to connect, in response to determining that the computing device cannot connect to the first wireless network using the one channel, the computing device to the first wireless network using another channel resulting in improved capacity of data transmission on the first wireless network and/or the second wireless network.

\* \* \* \* \*